June 5, 1945. M. J. SHAFFREY 2,377,581
DIVIDED NUT CONSTRUCTION
Filed March 9, 1944

INVENTOR;
MATTHEW J. SHAFFREY
BY
ATTORNEY

Patented June 5, 1945

2,377,581

UNITED STATES PATENT OFFICE 2,377,581

DIVIDED NUT CONSTRUCTION

Matthew J. Shaffrey, St. Louis, Mo.

Application March 9, 1944, Serial No. 525,739

3 Claims. (Cl. 85—32)

This invention relates to improvements in divided nut construction, and more particularly to an improved construction and arrangement of parts adaptable to a wide variety of retaining and fastening members within the broad recognized category of split nuts.

There exists in a number of the arts a need, under certain assembly conditions, for a divided or split nut. Some of the fields of usage in which devices of this type find widest adaptation, include the almost endless variety of situations in which, by reason of space restrictions or otherwise, access to the nut for turning same on the bolt or shaft is exceedingly difficult. In many other locations, even though access may be readily had to a nut for its rotation by means of an end wrench or the like, unless the nut is of split type, it is necessary to provide an unnecessary or excess threaded length of bolt or shaft which receives the nut. Such a situation is frequently encountered in power transmission shafting and in similar situations. It is of course desirable to provide a divided nut which is susceptible of rotative actuaton in the usual manner, as by a wrench or the like, and yet which may, to meet certain emergencies as in case of "freezing" in place due to rusting or for other reasons, be parted laterally from a shaft, bolt or threaded rod.

The general types of devices which have more prominently appeared heretofore, may partly be grouped in one category, in which the half-nut elements collectively providing a full threaded bore, are kept in assembly by a full circular collar or sleeve.

This type, upon freezing in place, offers great difficulty in removal, and in some types the first cost is excessive. Another probably more usual type is realized in the provision of two half elements which are hingedly or pivotally connected to each other, and which are secured in either open or closed positions as by a threaded element which is directly subject either to high searing or bending stresses, or is subjected to tension in a direction to strip the threads of the holding element. Either of these types is objectionable, either because of difficulty of removal of a split nut which has been in service for some time, or as exhibiting a marked reduction in strength of nut in comparison with unitary structures of standard type. It is accordingly a principal object of the present invention fully to overcome each and all of the foregoing shortcomings, and fully to meet all requirements of the trade for a split nut which can be economically produced by automatic equipment.

Another object of the invention is attained in the provision of tension elements of unusual strength, by which the halves of the divided nut are securely held in assembly, and of such nature that they may be readily removed when desired, so as to permit repeated re-use of the assembly.

Yet another important objective is attained in the provision of nut-half-securement members which are better able to resist without deformation, the high tension or shearing stresses incident to rotation of the nut.

A further object of the invention is attained in an assembly in which the nut halves and a pair of holding elements in the nature of keys or tenons, serve collectively to constitute an exceedingly sturdy divided nut structure which is or may be of normal hexagonal or other polygonal outline and dimensions, such that, when desired, the nut may be actuated by any usual form of wrench.

The foregoing and numerous other objects will more clearly appear from the following detailed description of a presently preferred embodiment of the improvements, particularly when considered in connection with the accompanying drawing in which.

Figure 1:
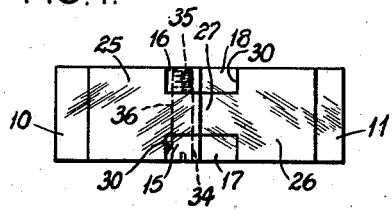
Fig. 1 is an edgewise elevation or plan of a divided nut assembly embodying present improvements.

Referring now by characters of reference to the drawing, the two major elements of the assembly, or otherwise expressed, the halves of the divided nut as such, are indicated at 10 and 11, these being formed to provide in the element 10, a half cylindrical bore 12 and in the member 11, a similar half bore 13, the bore being tapped so as to provide, for example, a standard thread indicated at 14. Each of the members 10 and 11 is preferably of a one-piece construction, and is provided with a pair of integral upstanding arms 15 and 16 on the member 10, and 17 and 18 on the member 11. The arms of each of these pairs are spaced apart as will readily appear from Figs. 1 and 4, and the outer ends of these several arms are angularly faced as shown at 20. Since each of the nut halves 10 and 11 is provided with a similar, companion pair of arms at top and bottom, the aforesaid description will be understood as applicable to both pairs of arms on each half nut body.

Figure 4:
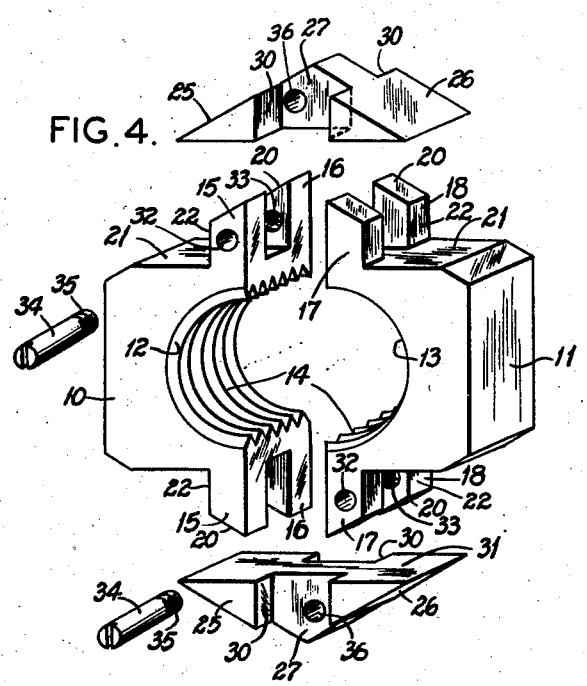
Fig. 4 is an exploded, oblique view illustrating the several parts in positions to be readily fitted together to form the assembly.

It will readily appear from Fig. 4 that there is provided on each of the half nuts, a planar face 21 which extends as shown, to the space between the arms 15—16 or 17 and 18, it further appearing that each of the arms 15—16—17—18 is provided with and bounded by a series of planar faces including the faces 22, serving as will hereinafter appear, to constitute abutments in coaction with the key elements to be described.

Proceeding now to a description of the locking means by which the two nut halves are secured in assembly, these consist by preference of a pair of double head links, keys or tenons, and since the two such elements are or may be identical or substantially similar, a description of one thereof will suffice for both. The two heads of each key are indicated at 25 and 26, each being of a prismatic form, and the key-forming element being laterally undercut from each side to provide a connecting or tension link or bar 27, the outermost faces of which are continuations respectively of the outermost faces of the heads 25 and 26. The undercut portion of each link is such that there results one each of the heads 25 and 26 a distinct right angular shoulder or abutment 30 on each side of the link 27 on each of the heads, resulting in a total of four such abutments on each link. The bottom surface of the link, shown at 31, is of a continuous planar aspect as will best appear from Fig. 4, the surface 31 being coextensive with and of a conformity similar to the surface 21, as will appear.

It will now have been noted that the shaping imparted to the tenon key members is such that, when they are inserted in place, each in the seat or seats therefore in the coacting half nuts, the keys coact with the nut forming elements so as to provide a divided nut assembly of regular angular outline which may be of square, hexagonal or other polygonal shaping, and so conform to the outline as well as the dimensions of a standard nut of the same size and purpose. It will now have appeared that the width or thickness of the link or bar 27 is exactly equal, with working clearance, to the spacing between each of the pairs of arms or lugs 15—16 and 17—18.

Proceeding now to the manner of assembly of the elements to form a complete and operative structure, although this is thought to have become obvious from the foregoing description, it may be noted that the halves 10 and 11 are brought together laterally on opposite sides, say of a partly threaded shaft, and are temporarily held in a position somewhat retracted from final nut position, at which time the key elements are applied edgewise of the nut, into the key seats, with each of the link bars 27 fully seated depthwise into the spaces between the upstanding lugs such as 15—16, both keys being similarly applied. The structure assembled as noted, now becomes an operative nut, and may be threaded up as by application and rotation of a socket or end wrench as desired.

It is contemplated and is fully satisfactory according to experiments in certain fields of usage wherein the nut serves a solely structural purpose, so to provide for a practically negligible clearance between the sides of the arms 27 and inner faces of the lugs 15—16 and 17—18, so that, under such circumstances, the keys may be pressed or driven into seated position and frictionally retained therein. It may be desirable, however, in other fields of usage to provide means especially for the retention of the key elements in their seats in the paired nut halves. One low-cost and completely satisfactory arrangement for this purpose consists in the provision of a small through opening or bore 32 in one of the lugs or arms such as 15, and an aligned bore 33 in the companion arm such as 16, one of these paired bore portions being threaded for the reception of a headless pin 34, the latter being, if desired, threaded as shown at 35 to constitute a screw. A small bore of similar diameter indicated at 36 extends through one of the heads of each of the keys in such position that, when the key is in assembly position, the pin 34, if threaded, may be inserted first through bore 32, thence through bore 36 and afterward threaded into engagement with the bore 33. When the pin 34 is securely threaded up the parts are firmly and ruggedly assembled in a manner to provide for any conditions of usage which might be encountered by a one-piece standard nut.

Figure 2:
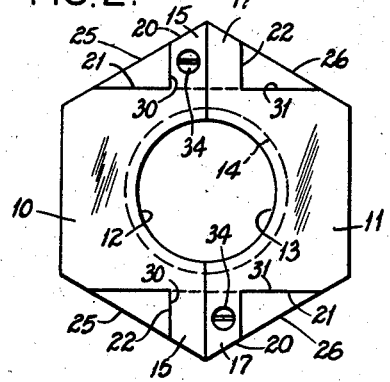
Fig. 2 is an elevation, taken facewise of the assembly of Fig. 1.
Figure 3:
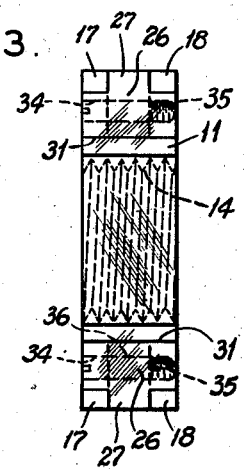
Fig. 3 is an end elevational view of the assembly of Fig. 2.

It is a preference, as will appear from Fig. 2, when utilizing the threaded pins 34, to form only one of the pairs of lugs of each half nut to receive the pin, and in assembly to extend the pins through relatively opposite pairs of lugs at top and bottom. The manner of assembly of the parts of the divided nut will at once indicate a relatively reverse order of steps to effect their disassembly. In the event the pins 34 are used, they are unthreaded and drifted out of their bores, and whether or not the pins are used, removal of the keys may be readily effected by prying them outwardly in a direction edgewise of the nut. When thus freed from the nut halves, the latter may be readily separated, even when badly corroded and frozen tightly in place, by a light hammer blow or other disturbing impact.

It will now have appeared that the assembly as described will serve fully to attain each and all of the several objects expressed in and implied from the foregoing description. Although the disclosure has been presented in considerable detail, the detail of description is to be understood solely in an instructive and not in any limiting sense, since numerous variants may be made within the scope of the claims hereunto appended.

I claim as my invention:

1. In a split nut, a pair of half-nut elements adapted in assembly to form a nut assembly of a regular polygonal outline, and to provide a full threaded bore, and a pair of key members each insertable edgewise of the assembly of half nut elements, each key element formed to provide a pair of spaced abutments with a tension arm connecting the abutments, the half nut elements being recessed to provide in assembly, a pocket for receiving each key member, the pockets being of an angulate section to provide shoulders engaged by the opposite abutments of each key member.

2. In a divided nut assembly, a pair of half-nut elements, a pair of tenon keys insertable edgewise into the coacting half-nut elements, the latter providing, in assembly, recesses substantially conforming to the tenon keys, said keys being located in the nut in a position to oppose tension stresses tending to separate the halves of the nut upon rotation of the assembled nut, each of the keys having a link extending in a direction to take such tension stresses, and each provided with a pair of abutments at substantially a right angle to its link, the recesses in the nut halves being formed to provide shoulders substantially coplanar with the tension key abutments.

3. In a divided nut assembly, a pair of half-nut elements, a pair of tenon keys insertable edgewise into the coacting half-nut elements, the latter providing in assembly, recesses substantially conforming to the tenon keys, said keys being located in the nut in a position to oppose tension stresses tending to separate the halves of the nut incident to torsion applied to the assembled nut, each of the keys having a link extending in a direction to take such tension and each provided with a pair of abutments at substantially a right angle to its link, the recesses in the nut halves being formed to provide shoulders substantially coplanar with the tension key abutments, each of the tenon keys further forming parts of two faces of a hexagonal nut, the half elements of the nut and the keys being otherwise formed so as substantially to preserve the nut in standard hexagon outline and dimensions.

MATTHEW J. SHAFFREY.